United States Patent
Dezonno

(10) Patent No.: US 6,295,354 B1
(45) Date of Patent: Sep. 25, 2001

(54) METHOD FOR INCOMING CALL ANSWERING FOR AUTOMATIC CALL DISTRIBUTORS

(75) Inventor: Anthony J. Dezonno, Chicago, IL (US)

(73) Assignee: Rockwell Semiconductor Systems, Inc., Newport Beach, CA (US)

( * ) Notice: Subject to any disclaimer, the term of this patent is extended or adjusted under 35 U.S.C. 154(b) by 0 days.

(21) Appl. No.: 09/105,066

(22) Filed: Jun. 26, 1998

(51) Int. Cl.[7] .................................................. H04M 3/00
(52) U.S. Cl. ............................ 379/266; 379/265; 379/309
(58) Field of Search .................................. 379/265, 266, 379/309, 212

(56) References Cited

U.S. PATENT DOCUMENTS

| | | | |
|---|---|---|---|
| Re. 36,051 | * 1/1999 | Adams et al. ...................... | 379/266 |
| 3,887,902 | * 6/1975 | Labalme .............................. | 379/289 |
| 4,858,120 | * 8/1989 | Samuelson .......................... | 705/11 |
| 5,166,974 | * 11/1992 | Morganstein et al. ............... | 379/67 |
| 5,247,569 | * 9/1993 | Cave .................................... | 379/113 |

\* cited by examiner

Primary Examiner—Ahmad Matar
Assistant Examiner—Hector Agdeppa
(74) Attorney, Agent, or Firm—Welsh & Katz, Ltd.

(57) ABSTRACT

A method and apparatus are provided for accepting a call by an automatic call distributor from a public switch telephone network. The method includes the steps of determining an average call wait time between arrival of the call on a trunk line of the automatic call distributor from the public switched telephone network and delivery of the call to a selected agent and delaying acceptance of a call detected on the trunk line from the public switch telephone network by a predetermined time period less than the average call wait time.

21 Claims, 2 Drawing Sheets

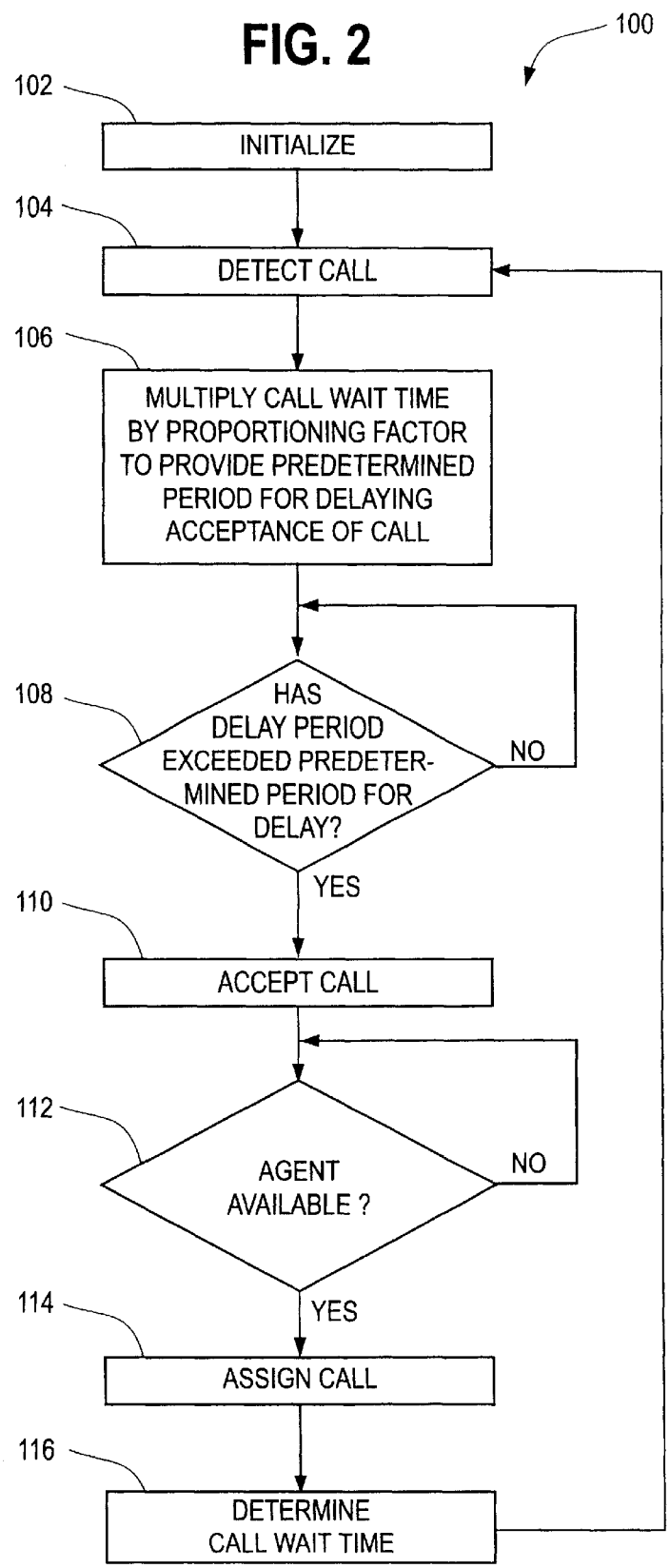

METHOD FOR INCOMING CALL ANSWERING FOR AUTOMATIC CALL DISTRIBUTORS

FIELD OF THE INVENTION

The field of the invention relates to telephone systems and in particular to automatic call distributors.

BACKGROUND OF THE INVENTION

Automatic call distribution systems are known. Such systems are typically used in an organizational context within private branch telephone exchanges (PBXS)as a means of distributing telephone calls among a group of agents of the organization. While the automatic call distributor (ACD) may be a separate part of the PBX, often the ACD is integrated into and is an indistinguishable part of the PBX.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to distribute incoming calls from the PSTN to the available agents, the interaction of a controlling computer with a switching fabric of the PBX and ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

Calls are typically placed in a queue when insufficient agents are available to answer the calls as they appear on incoming trunks. Messages are often delivered to callers in the queue as they wait for the next available agent.

Queues are often used as a means of averaging a call load to a group of agents. The message delivered to the caller is often sufficient to maintain the caller's interest as he waits and may even be used to solicit information from the caller.

While call queues are effective, they are expensive to use. Called numbers on incoming trunks are often 800 numbers, paid for by the called party. Where a call is answered and a caller is placed in a queue, charges for that call immediately begin to accumulate.

In general, where the time spent by each caller in a queue can be reduced, the expense of incoming calls to an 800 number can also be reduced. Past efforts to reduce queue time have included the imposition of a fixed delay on the answering of each call. The fixed delay may be imposed by either a predetermined time period or by delivery of a predetermined number of ringbacks to the caller.

While the prior art use of delay has been effective, the use of a fixed delay is not appropriate in all situations. For instance when the time period between agent availability is shorter then the fixed delay, the agent may remain idle until the fixed delay expires. Further, since incoming calls are to the organization, not to individual agents, the use of a busy signal is not appropriate and would cause some callers to hang up. Accordingly, a need exists for means of dynamically linking call acceptance to agent availability.

SUMMARY

A method and apparatus are provided for accepting call by an automatic call distributor from a public switch telephone network. The method includes the steps of determining an average call wait time between arrival of the call on a trunk line of the automatic call distributor from the public switched telephone network and delivery of the call to a selected agent and delaying acceptance of a call detected on the trunk line from the public switch telephone network by a predetermined time period less than the average call wait time.

BRIEF DESCRIPTION OF THE DRAWINGS

FIG. 2 depicts a flow chart of call processing under the method practiced with the structure of FIG. 1.

DETAILED DESCRIPTION OF A PREFERRED EMBODIMENT

Figure 1:
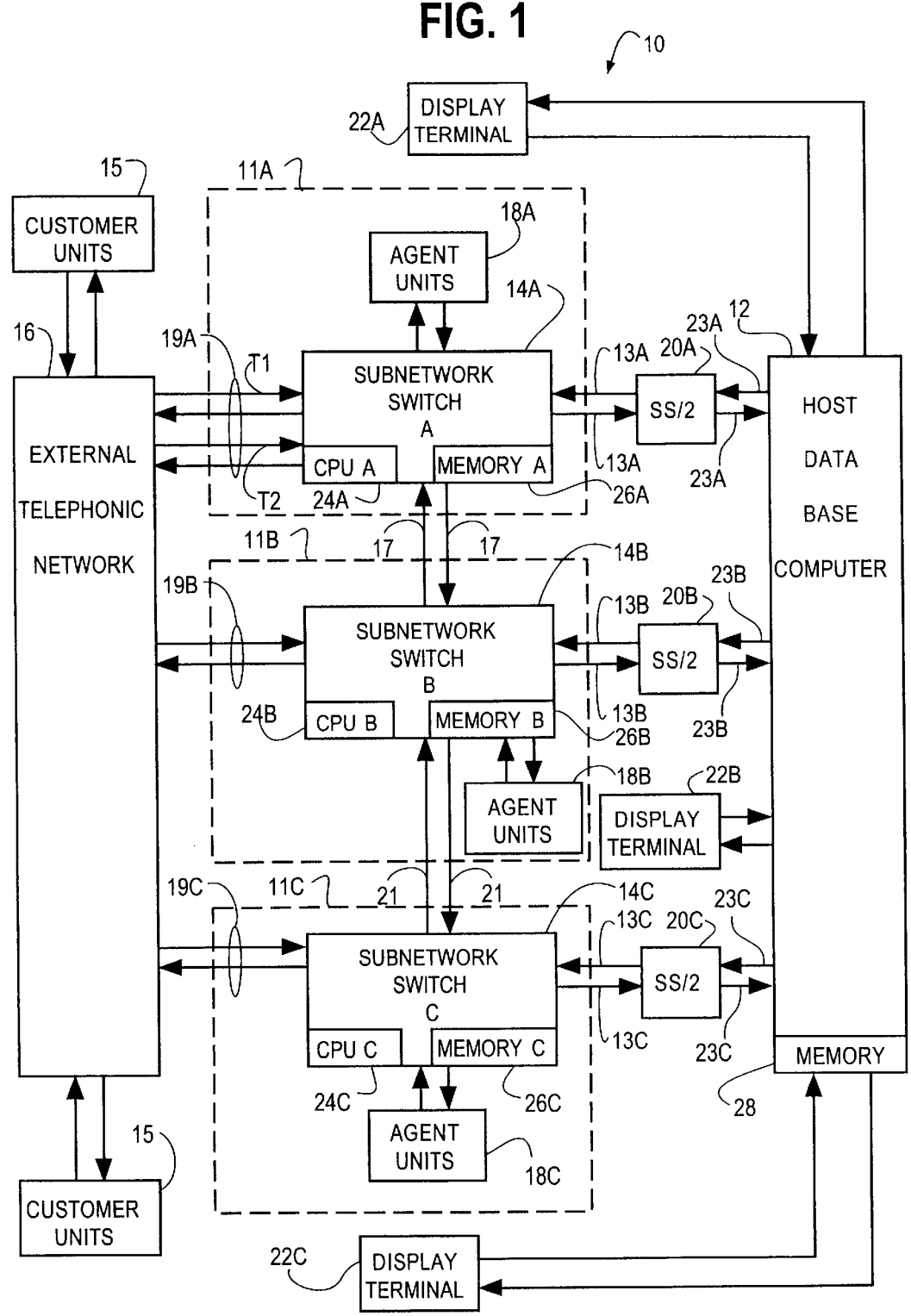
FIG. 1 depicts an automatic call distribution system in accordance with an embodiment of the invention.

FIG. 1 is a block diagram of an automatic call distribution (ACD) system 10 in accordance with an embodiment of the invention. ACDs similar to the type shown in FIG. 1 may be available from any of a number of manufacturers (e.g., the Spectrum Automatic Call Distribution system made by Rockwell International Corporation of Seal Beach, Calif.).

Under the embodiment, a first, second and third internal ACD networks 11A, 11B, 11C are connected to a host database computer 12 and the PSTN 16. Internal networks 11A, 11B, 11C may be located at geographically diverse locations and may be interconnected one-to-another by an appropriate interconnecting group of private lines 17, 21 (e.g., leased lines, virtual private lines, microwave links, dedicated T1 lines, etc.). Similarly, the internal networks 11A, 11B, 11C may be interconnected with the host 12 through an appropriate data link (e.g., leased lines, virtual private lines, microwave link, the Internet, digital packet switching, etc.).

While the individual ACD networks 11A, 11B, 11C may be interconnected directly with the host 12, it is understood that a CallPath SwitchServer/2 (20A, 20B, 20C) available from IBM may be provided for interconnecting the networks 11A, 11B, 11C with the host 12. The SwitchServer/2 may be used to reduce the communication burden between the host 12 and ACDs 11A, 11B, 11C.

The SwitchServer/2 may be an IBM compatible ISA PC with a Pentium 120 MHZ processor or higher having 16 Mbyte RAM, 125 Mbyte fixed disk and an IBM X.25 Interface Co-Processor/2. An IBM X.25 Interface Co-Processor/2 Cable Option V.24 may be used as an interface with the networks 11A, 11B, 11C. Ethernet or Token Ring Interface cards may be necessary depending upon the configuration of the ACD system 10.

Software for the SwitchServer/2 may be provided using the IBM Operating System/2 (OS/2) Version 3.1 with Communications Manager/2 Version 1.1 or later. An IBM Local Area Protocol Support (LAPS) may be used for support and control of the X.25 interface.

The internal networks 11A, 11B, 11C may be connected to the PSTN 16 through a number of trunk lines 19A, 19B, 19C. The PSTN 16 may offer telephone service to the system 10 on trunk lines 19A, 19B, 19C in conjunction with a number of call-delivery features such as ANI and DNIS.

DNIS information supplied by the PSTN 16 is useful for the internal networks 11A, 11B, 11C where inbound calls to the internal networks 11A, 11B, 11C may be directed to any of a block of telephone numbers assigned to each of the internal networks 11A, 11B, 11C. This may be useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C of the internal networks 11A, 11B, 18C. As such, each switch 14A, 14B, 18C functions as an automatic call distributor within its own internal network 11A, 11B, 18C.

The switches 14A, 14B, 18C are controlled by central processing units, or CPUs, 24A, 24B, 24C, in conjunction with peripheral memory devices 26A, 26B, 26C. Control of the switches 14A, 14B, 14C and communications with the host 12 and PSTN 16 may be accomplished generally as described in U.S. Pat. No. 5,268,903, and U.S. Pat. No. 5,140,611, both to Jones, and both incorporated herein by reference. Routing of calls to agents 18A, 18B, 18C and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPUs 24A, 24B, 24C monitor each port of the switch 14A, 14B, 14C for changes in status. A change in status may be an agent unit 18A, 18B, 18C going off-hook to make a call, an agent unit 18A, 18B, 18C hanging up after a call, or it may be a call alerting tone detected on a trunk 19A, 19B, 19C alerting the CPU 24A, 24B, 24C to the presence of an incoming call.

Where the status change is an agent 18A, 18B, 18C hanging up, the CPU 24A, 24B, 24C acts to tear-down the call connection within the switch 14A, 14B, 14C between the agent at a first port of the switch and a second party to the conversation communicating through a second port of the switch 14A, 14B, 14C. Upon tear down of the connection, the CPU 24A, 24B, 24C also sends a message to the host, notifying the host of termination of the call connection. The message to the host 12 would include at least the identity of the agent 18A, 18B, 18C.

Where the status change is an agent 18A, 18B, 18C going offhook, the CPU 24A, 24B, 24C interprets such change as preparation for the placement of a telephone call. As such, the CPU 24A. 24B, 24C prepares to receive a set of dialed digits. Upon receiving the digits and if the digits are determined as being a call directed to an outside party, then the CPU 24A, 24B, 24C may seize an outgoing trunk line 19A, 19B, 19C and send a call alert followed by the dialed digits. Where the alert is answered by a call connection acknowledgment, the CPU 24A. 24B, 24C completes the connection between the port of the agent (e.g., 18A, 18B, 18C) and the port of the seized trunk line.

If the call is directed to another agent 18A, 18B, 18C or some other party within the organization, then the CPU 24A, 24B may identify the port to which the calling party is to be connected by reference to a lookup table within memory 26A, 26B, 26C. Upon locating the party, the CPU 24A, 24B, 24C may then cause a connection to be set-up between appropriate ports within the switch 14A, 14B, 14C between the calling and called party.

Where the status change is a call alert signal on an incoming trunk line (or a control channel associated with an incoming trunk line), then the CPU 24A, 24B, 24C may send an acknowledge message to the PSTN 16 accepting the call. The PSTN 16 may respond with the forwarding of DNIS and ANI messages, identifying the called and calling party.

Upon accepting the call, the CPU 24A, 24B, 24C first stores the DNIS and ANI numbers in a termination table of the memory 26A, 26B, 26C. More specifically, the CPU 24A, 24B, 24C maintains a table of call information for each port of the switch 14A, 14B, 14C. Where a call is accepted on an incoming trunk line, the CPU 24A, 24B, 24C enters the DNIS and ANI number into the table for the incoming trunk line upon which the call is received.

In addition to updating the termination table within memory 26A, 26B, 26C, the CPU 24A, 24B, 24C also generates a call identifier (also sometimes referred to as a call ID or sequence number) for the call, unique to the ACD 11A, 11B, 11C. The call identifier along with the ANI and DNIS numbers may then be sent to the host 12 as part of a call arrival message. Delivery of the ANI and DNIS numbers and call identifier allows the host 12 to create a unique call record for the call in memory 28, in a call record area of memory 28 reserved for the ACD 11A, 11B, 11C. The call record may be used to retrieve customer records for delivery to an appropriate display terminal 22A, 22B, 22C once the call has been assigned to an agent 18A, 18B, 18C.

The CPU 24A, 24B, 24C then, by reference to the DNIS number, determines the identity of agent 18A, 18B, 18C to which the call is to be directed. For example, the DNIS number may be used to differentiate between calls directed to a first telephone number arriving on a, first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18A, 18B, 18C (or group of agents) the CPU 24A, 24B, 24C instructs the switch 14A, 14B, 14C to internally connect the port of the incoming trunk to the port of the identified agents.

Where the call has been connected to an agent, the CPU 24A, 24B, 24C stores the port number of the identified agent in the termination table for the port of the incoming trunk. Likewise, the CPU 24A, 24B, 24C stores the port identifier of the incoming trunk in the termination table of the identified agent.

To complete set-up of the call to the identified agent, the CPU 24A, 24B, 24C sends a call completion message to the host 12. The call completion message includes at least a port identifier of the identified agent and the call identifier. The call identifier allows the host 12 to reference the original call record created by the host 12 upon receipt of the call arrival message. Since the call arrival record has a customer identifier (i.e., the ANI number), the port identifier allows the host 12 to deliver customer data to the specific display terminal 22A, 22B, 22C of the agent to which the call was delivered.

In the alternative, if all of the agents (e.g., 18A) were busy, then an incoming call (e.g., received on incoming trunk Tl of the first switch 14A) would be placed in a queue. While in the queue, the CPU 24A compares certain parameters of each call in the queue (e.g., time in the queue) with a set of overflow threshold values. Where the parameters of the queued call exceed one or more of the overflow threshold values, the call may be considered a candidate for overflow to another switch.

While the use of a call queue may function as a means of absorbing instantaneous overloads, the use of a queue also results in increased overhead for an ACD system operator. Under an illustrated embodiment of the invention, the time a call spends in a call queue is carefully controlled by the CPU 24A, 24B, 24C of each a ACD 11A, 11B, 11C.

Under the embodiment, whenever call arrival is detected at an ACD 11A, 11B, 11C, the time of arrival may be recorded by the CPU 24A, 24B, 24C and stored as an attribute of the call. The time of arrival may be recorded by the CPU 24A, 24B, 24C storing a time value (e.g., time of day) in the termination table for the trunk upon which the call is detected. Alternatively, the time value may be sent to the host 12 and become part of the call record for the call.

Alternatively, a separate timer may be allocated in the CPU 24A, 24B, 24C for each incoming trunk. Upon detection of an incoming call, the corresponding timer may be activated.

Following selection of an agent for call handling, the CPU 24A, 24B, 24C instructs the switch 14A, 14B, 14C to connect (deliver) the call to the selected agent. Upon connection of the call to the selected agent, the CPU 24A, 24B, 24C also notes the time of connection to the agent. Again, the time of connection may be stored in the termination table in association with the call or in the call record stored in the host 12.

By comparing the time of arrival of the call with the call delivery time, the CPU 24A, 24B, 24C is able to determine a call wait time between arrival of the call on a trunk line and delivery of the call to a selected agent. Once a call wait time has been determined, the CPU 24A, 24B, 24C may take steps to delay call acceptance for a time period commensurate with the determined call wait time.

FIG. 2 depicts a flow chart 100 that may be used to provide an understanding of the process of delaying call acceptance under an illustrated embodiment of the invention. Reference shall be made to FIG. 2 as appropriate to an understanding of the invention.

Following initialization 102, the CPU 24A, 24B, 24C may detect call arrival 104 at the switch 14A, 14B, 14C. As an initial step, the CPU 24A, 24B, 24C may multiply a call wait time (or a portion of the call wait time) by a proportioning factor 106 to provide a predetermined delay for delaying acceptance of the call.

The proportioning factor may be any arbitrarily chosen value between 0.0 and 1.0. To completely eliminate all or only a portion of the access charges for queuing time, a value of 1.0 may be chosen. To allow at least some load averaging, a lesser value (e.g., 0.75–0.9) may be chosen. Where a lesser value is chosen, it would be expected that after call acceptance, the call would be placed in a queue until assigned to an agent.

In operation and upon startup of the system 10, it would be expected that an initial call wait time of zero would reside in each of the CPUs 24A, 24B, 24C. Since the initial wait time would be zero, the predetermined period for acceptance of calls would also be zero.

As calls begin arriving, each call may be immediately placed in a queue, as done in the prior art.

As each call is placed in an appropriate queue, the time the call resided in the queue before assignment to an agent is measured. Initially, the call wait time would be determined exclusively by the time incoming calls reside in the queues. Further, the call wait time used (under the illustrated embodiment of FIGS. 1 and 2) for calculating the predetermined period of delay may be an average call wait time. Where an average call wait time is used, an appropriate number of incoming calls may be measured (e.g., the 25 most recent calls) and used to determine an average call wait time. This may be after the first 25 calls are received, or only later when loading on the ACD 11A, 11B, 11C increases to a point where a delay is experienced on every incoming call.

In either case, once an average call wait time (e.g., 10 seconds) is determined, it may be multiplied by a proportioning factor (e.g., 0.75) to determine a predetermined period of delay (e.g., 7.5 sec). Once a predetermined period of delay is determined, call acceptance may be deferred until expiration of the predetermined period. Once the period has expired, the call is accepted 110 and placed in a queue. When an agent is available 112, the call is assigned (connected) 114 to the agent.

As each call is assigned and delivered 114 to an agent, a new call wait time is determined for the call. The new call wait time may be determined by adding the predetermined period (before acceptance of the call) to the time the call waited in the queue (before delivered to an agent). The new call wait time may be averaged with prior values (e.g., the previous 24 calls).

Summing the predetermined period with time in queue allows the ACDs 11A, 11B, 11C to seamlessly transition from periods of light loading to periods of heavy loading. Further, a maximum average time in queue (e.g., 5 seconds) may be used as a threshold before the predetermined period for delay is allowed to transition from a zero value to some value proportional to the average call wait time.

As an example, 25 calls may be averaged to determine an average call delay. If the first 20 calls experienced a 6 second delay and the last 5 calls experienced a zero second delay, the average call delay would be less than 5 seconds and the predetermined period for acceptance of the call would remain at zero.

On the other hand, if all 25 calls experienced a 6 second delay, then a predetermined period for delay would be determined. Where the proportioning factor was set at 0.75, then the predetermined period for delay would become 4.5 seconds.

In another embodiment, a predetermined queue time value may be subtracted from the average call wait time in an attempt to maintain a relatively constant queue time. A relatively constant queue time may be useful for presenting options to the caller or for greetings or for soliciting information from the caller and entering the solicited information through the keypad of the caller's telephone.

It would be expected that where a predetermined queue time value were used, a proportioning factor of 1.0 may also be used. Using a proportioning factor of 1.0 would substantially eliminate any line charges beyond that absolutely necessary for audio presentations.

In another embodiment of the invention, a predetermined period for acceptance of a call may be determined for each agent group. Upon call appearance, the CPU 24A, 24B, 24C may receive DNIS and ANI information from the PSTN 16. From the DNIS and ANI information, the CPU 24A, 24B, 24C may identify and segregate call handling by group. A separate average call wait time may be determined for each group. Proportionality factors may also be different for each group. A different predetermined period of delay until acceptance may be calculated for each group.

A specific embodiment of a method and apparatus of delaying call acceptance according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of accepting calls by an automatic call distributor from a public switch telephone network, such method comprising the steps of:

determining an average call wait time between arrival calls on a trunk line of the automatic call distributor from the public switched telephone network and delivery of the calls to a selected agent; and delaying acceptance of a call detected on the trunk line from the public switch telephone network by a predetermined time period less than the average call wait time.

2. The method of accepting calls by an automatic call distributor as in claim 1 further comprising measuring a time interval from time of arrival of the call on the trunk and accepting the call at the expiration of the predetermined time period.

3. The method of accepting calls by an automatic call distributor as in claim 2 wherein the step of accepting the call further comprising placing the call in a call queue until delivery of the call to the selected agent.

4. The method of accepting calls by an automatic call distributor as in claim 3 wherein the step of placing the call in the call queue further comprises measuring a time interval between placement of the call in the call queue and delivery of the call to the selected agent.

5. The method of accepting calls by an automatic call distributor as in claim 4 further comprising adding the measured time interval in the call queue to the time period to provide a current call wait time.

6. The method of accepting calls by an automatic call distributor as in claim 5 further comprising averaging the current call wait time with past call wait times to determine the average call wait time.

7. The method of accepting calls by an automatic call distributor as in claim 1 further comprising multiplying the average call wait time by a fraction to determine the time period.

8. Apparatus for accepting calls by an automatic call distributor from a public switch telephone network, such apparatus comprising:

means for determining an average call wait time between arrival of calls on a trunk line of the automatic call distributor from the public switched telephone network and delivery of the call to a selected agent; and means for delaying acceptance of a call detected on the trunk line from the public switch telephone network by a predetermined time period less than the average call wait time.

9. The apparatus for accepting calls by an automatic call distributor as in claim 8 further comprising means for measuring a time interval from time of arrival of the call on the trunk and accepting the call at the expiration of the predetermined time period.

10. The apparatus for accepting calls by an automatic call distributor as in claim 9 wherein the means for accepting the call further comprising means for placing the call in a call queue until delivery of the call to the selected agent.

11. The apparatus for accepting calls by an automatic call distributor as in claim 10 wherein the means for placing the call in the call queue further comprises means for measuring a time interval between placement of the call in the call queue and delivery of the call to the selected agent.

12. The apparatus for accepting calls by an automatic call distributor as in claim 11 further comprising means for adding the measured time interval to the time period to provide a current call wait time.

13. The apparatus for accepting calls by an automatic call distributor as in claim 11 further comprising means for averaging the current call wait time with past call wait times to determine the average call wait time.

14. The apparatus for accepting calls by an automatic call distributor as in claim 8 further comprising means for multiplying the average call wait time by a fraction to determine the time period.

15. Apparatus for accepting calls by an automatic call distributor from a public switch telephone network, such apparatus comprising:

a wait time processor which determines an average call wait time between arrival of calls on a trunk line of the automatic call distributor from the public switched telephone network and delivery of the call to a selected agent; and a delay timer which delays acceptance of a call detected on the trunk line from the public switch telephone network by a predetermined time period less than the average call wait time.

16. The apparatus for accepting calls by an automatic call distributor as in claim 15 further comprising a timer which measures a time interval from time of arrival of the call on the trunk and accepts the call at the expiration of the predetermined time period.

17. The apparatus for accepting calls by an automatic call distributor as in claim 16 wherein the timer which accepts the call further comprising a call acceptance processor which places the call in a call queue until delivery of the call to the selected agent.

18. The apparatus for accepting calls by an automatic call distributor as in claim 17 wherein the call acceptance processor which places the call in the call queue further comprises a timer which measures a time interval between placement of the call in the call queue and delivery of the call to the selected agent.

19. The apparatus for accepting calls by an automatic call distributor as in claim 18 further comprising an adder which adds the measured time interval to the time period to provide a current call wait time.

20. The apparatus for accepting calls by an automatic call distributor as in claim 19 further comprising an averaging processor which averages the current call wait time with past call wait times to determine the average call wait time.

21. The apparatus for accepting calls by an automatic call distributor as in claim 20 further comprising a multiplier which multiplies the average call wait time by a fraction to determine the time period.

* * * * *